(12) United States Patent  (10) Patent No.: US 7,969,291 B2
Mangum et al.  (45) Date of Patent: Jun. 28, 2011

(54) FUEL ENRICHMENT INDICATOR

(75) Inventors: Doug Mangum, Ann Arbor, MI (US); Daniel Yerace, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 373 days.

(21) Appl. No.: 12/186,152

(22) Filed: Aug. 5, 2008

(65) Prior Publication Data

US 2010/0033314 A1    Feb. 11, 2010

(51) Int. Cl.
B60Q 1/00    (2006.01)
(52) U.S. Cl. .......... 340/439; 340/438; 340/576; 701/29
(58) Field of Classification Search .......... 340/439, 340/438, 441, 450.2, 576, 641, 691.6; 60/274, 60/276, 286; 701/1, 29, 114, 115, 102
See application file for complete search history.

(56) References Cited

U.S. PATENT DOCUMENTS

| | | | |
|---|---|---|---|
| 2,685,198 A | 8/1954 | Saul, Sr. | |
| 4,170,201 A * | 10/1979 | Camp et al. | 123/682 |
| 4,397,178 A | 8/1983 | Chiba et al. | |
| 5,452,576 A | 9/1995 | Hamburg et al. | |
| 6,076,348 A | 6/2000 | Falandino et al. | |
| 6,360,530 B1 | 3/2002 | Robichaux et al. | |
| 6,487,849 B1 | 12/2002 | Bidner et al. | |
| 6,594,989 B1 | 7/2003 | Hepburn et al. | |
| 6,688,282 B1 * | 2/2004 | Okubo et al. | 123/339.11 |
| 7,003,382 B2 * | 2/2006 | Honda | 701/1 |
| 2002/0020170 A1 * | 2/2002 | Kakuyama et al. | 60/285 |

FOREIGN PATENT DOCUMENTS

JP    56108311    8/1981
JP    58202114    11/1983

* cited by examiner

Primary Examiner — Hung T. Nguyen
(74) Attorney, Agent, or Firm — Gifford, Krass, Sprinkle, Anderson & Citkowski, P.C.

(57) ABSTRACT

A method for signaling a driver of a motor vehicle that the motor vehicle is operating in a stoichiometric air/fuel mode or a non-stoichiometric air/fuel mode. The method includes providing an air/fuel sensor, the air/fuel sensor providing a signal that is representative of a stoichiometric air/fuel ratio mixture or a non-stoichiometric air/fuel ratio mixture being supplied to or burned by the motor vehicle. The method also includes providing a powertrain control module that is operable to receive the signal from the air/fuel sensor and to energize a light source when a non-stoichiometric air/fuel ratio mixture signal is received.

19 Claims, 2 Drawing Sheets

FUEL ENRICHMENT INDICATOR

FIELD OF THE INVENTION

The present invention relates generally to a fuel enrichment indicator. In particular, the present invention relates to an indicator for a richer than stoichiometric air/fuel ratio mixture in an engine.

BACKGROUND OF THE INVENTION

FIG. 1 illustrates an engine control module at reference numeral 10, where a plurality of inputs 12 can be received by a powertrain control module 14, and the powertrain control module 14 can provide a plurality of outputs 16. As shown in the figure, the plurality of inputs can include inputs from and/or in the form of a switch, variable resistor, alternating current (AC), direct current (DC), variable voltage and the like. In addition, the powertrain control module can process, monitor, analyze, etc. the inputs and provide a plurality of outputs to the engine from and/or in the form of a solenoid, light source, relay, motor, transistor and the like. It can be desirable that the plurality of inputs 12 are processed, monitored, analyzed, etc. for the purpose of providing one or more outputs 16 that optimize one of more functions of the engine. One such function can be the consumption of engine fuel.

The consumption of gasoline by motor vehicles continues to be a significant area for possible increased fuel efficiency. For example, in the year 2005 alone, over 136 million passenger vehicles burned over 73 billion gallons of gasoline based on U.S. Department of Transportation, Bureau of Transportation Statistics. Thus, various government organizations encourage drivers to use driving techniques that increase fuel economy. For example, the term "hypermilers" is recognized within the United States as drivers who exceed the Environmental Protection Agency's estimated mileage on their vehicles by modifying their driving habits.

Techniques that are used to maximize the fuel economy include upkeep of vehicle maintenance, minimizing mass of the vehicle during driving, slow acceleration during takeoff, and built-in trip computers that display real-time miles per gallon when a driver is operating the vehicle. Regarding the built-in trip computer, typically only a limited number of cars include this feature which provides the driver with a real-time indicator on how driving techniques affect their gas mileage. The complexity and cost of such a built-in trip computer prohibit their installation in most vehicles. Therefore, an indicator that would provide a driver with information on fuel economy as a function of their driving habits would be desirable.

SUMMARY OF THE INVENTION

A method for signaling a driver of a motor vehicle that the motor vehicle is operating in a stoichiometric air/fuel mode or a non-stoichiometric air/fuel mode is disclosed herein. The method includes providing an air/fuel sensor, the air/fuel sensor providing a signal that is representative of a stoichiometric air/fuel ratio mixture or a non-stoichiometric air/fuel ratio mixture being supplied to or burned by the motor vehicle. The method also includes providing a powertrain control module that is operable to receive the signal from the air/fuel sensor and to energize a light source when a non-stoichiometric air/fuel ratio mixture signal is received. In some instances, the non-stoichiometric air/fuel ratio mixture is a fuel enriched air/fuel ratio mixture. In addition, the powertrain control module can be operable to energize the light source as a function of a plurality of sensor signals, the sensor signals including the air/fuel ratio mixture, exhaust oxygen content, throttle position, mass airflow, engine coolant temperature, intake air temperature, vehicle speed and the like. Regarding the air/fuel ratio signal, this signal can be the result of a powertrain control module commanded air/fuel ratio, or in the alternative an exhaust detected air/fuel ratio.

DETAILED DESCRIPTION OF THE PRESENT INVENTION

Figure 1:
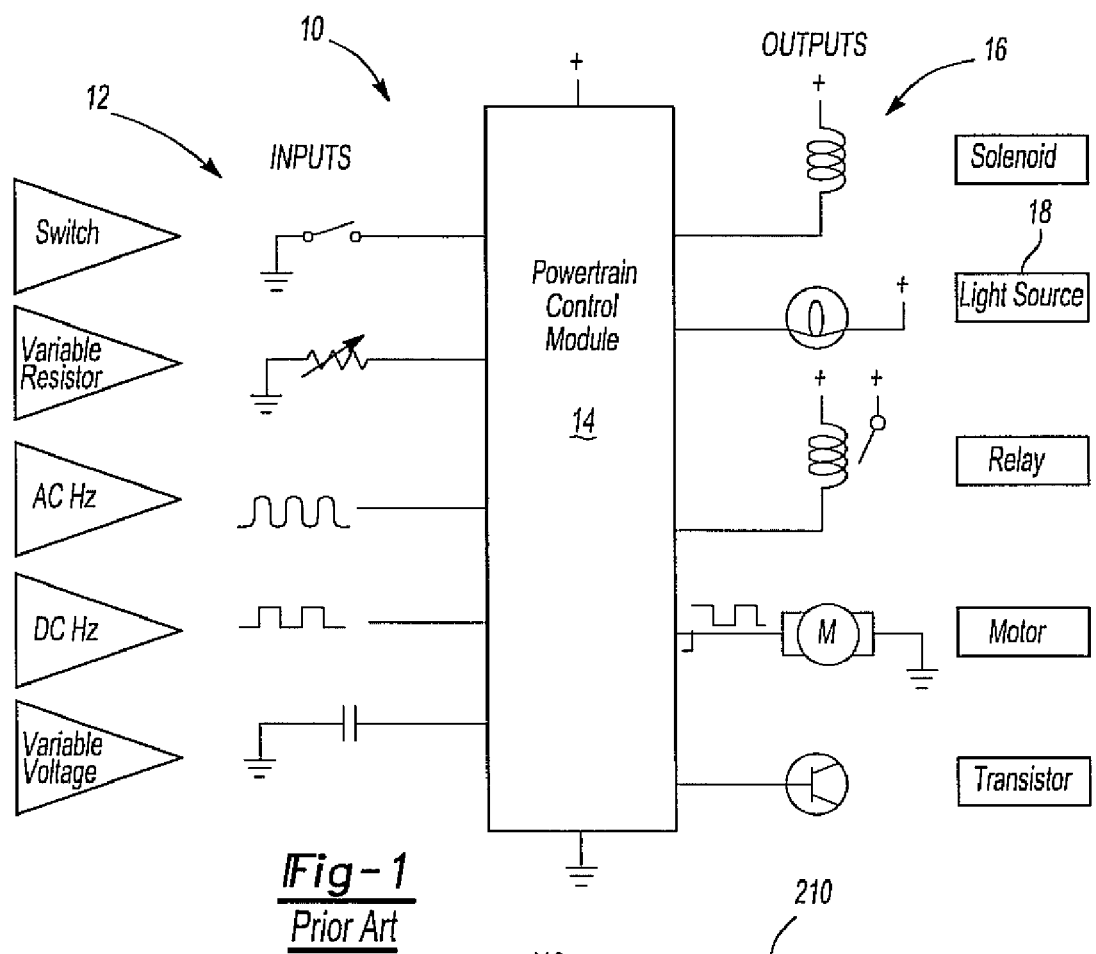
FIG. 1 is a schematic diagram of an engine control system.

The present invention discloses a method of signaling an operator of an engine that the engine is operating in a stoichiometric air/fuel ratio mode or a non-stoichiometric air/fuel ratio mode. As such, the method has utility for assisting an operator in improving the fuel economy of the engine.

An embodiment of the method includes providing a sensor that has an output signal that is representative of a stoichiometric air/fuel ratio mixture or a non-stoichiometric air/fuel ratio mixture being supplied and/or combusted by an engine. It is appreciated that for the purposes of the present disclosure, the sensor can be an air/fuel ratio sensor, an exhaust oxygen sensor and the like. In addition, the method can include providing an engine control module that is operable to receive the signal from the sensor and subsequently energize a light source when a non-stoichiometric air/fuel ratio mixture signal is received. The light source is located in the line of sight of the driver within an interior of the motor vehicle. In some instances, the non-stoichiometric air/fuel ratio mixture signal is representative of a richer than stoichiometric air/fuel ratio mixture.

An exhaust oxygen sensor generates a voltage signal as a function of oxygen content in an exhaust stream as compared to atmospheric oxygen. When the oxygen content is high, e.g. during lean burning of fuel by the engine, the oxygen sensor voltage output is low. In the alternative, when the oxygen content is low, e.g. during rich burning of fuel, the oxygen sensor voltage output is high. In some instances, an exhaust oxygen sensor produces a voltage output between 100 millivolts (mV) and 900 mV during normal operation.

The exhaust oxygen sensor typically has a zirconia element with one side exposed to an exhaust stream and another side open to the atmosphere. Each side of the zirconia element has a platinum electrode attached thereto, with the platinum electrodes conducting the voltage generated by the sensor. Contamination and/or corrosion of the platinum electrodes are known to those skilled the art to reduce the voltage signal output of the sensor. In addition, the oxygen sensor can be tested using a volt-ohm meter, for example a digital volt-ohm meter (DVOM).

An air/fuel ratio sensor, sometimes known as an A/F sensor or an AFR sensor, can have a physical appearance similar to an exhaust oxygen sensor, however the air/fuel ratio sensor has a different construction and mode of operation. In particular, the air/fuel ratio sensor provides a current as a function of oxygen content in the exhaust stream, instead of a voltage produced by the exhaust oxygen sensor. In addition, an engine control module uses the amperage provided by the air/fuel ration sensor to create a voltage signal that varies with oxygen content in the exhaust gases.

Typical air/fuel ratio sensors produce no current flow during stoichiometric burning of fuel by the engine and an overall detection circuit will output a voltage of approximately 3.3 volts. In the alternative, a positive current is produced by the air/fuel ratio sensor during lean burning of fuel with the detection circuit output being greater than 3.3 volts, while a negative current is produced by the air/fuel ratio sensor during rich burning of fuel and the detection circuit output being less than 3.3 volts. Air-fuel ratio sensors can typically detect air/fuel ratios over a wider range than oxygen sensors and thus allow the engine control module to more accurately control fuel injection and reduce emissions for the motor vehicle.

The powertrain control module can energize the light source as a function of a plurality of sensor signals. For example, assuming that the powertrain control module has received a non-stoichiometric air/fuel ratio mixture signal, it can also take into account signals received regarding the throttle position, mass airflow, engine coolant temperature, intake air temperature, vehicle speed and the like. In some instances, the air/fuel ratio mixture signal is obtained from an engine control module commanded air/fuel ratio or in the alternative can be obtained from an exhaust detected air/fuel ratio and/or an exhaust detected gas oxygen content. As an example, most modern engine management systems have to account for the temperature of the exhaust gas in order to prevent damage to an engine after-treatment system. In such instances, an engine control module can have an internal program or model that infers the exhaust gas temperature based on different engine input signals. If the model predicts the exhaust gas temperature exceeds some predetermined limit, the engine control module will command a richer air/fuel ratio to reduce the exhaust gas temperature.

Figure 2:
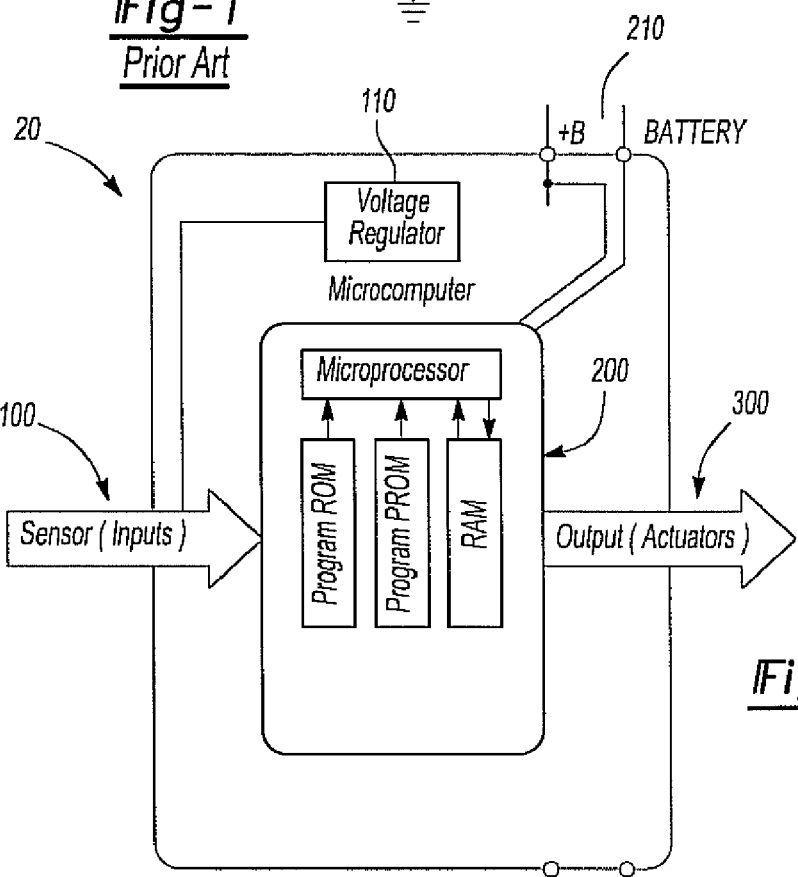
FIG. 2 is a schematic diagram of an embodiment of the present invention.

Turning now to FIG. 2, an embodiment of the method is shown generally at reference numeral 20. The method includes providing one or more sensor inputs 100, an engine control module 200 and one or more actuator outputs 300. The sensor inputs 100 can monitor the air/fuel ratio of an air/fuel mixture at a particular location within the engine and provide one or more signals to the engine control module 200. The sensor inputs 100 are operable to provide a signal that is representative of a stoichiometric air/fuel ratio mixture and a non-stoichiometric air/fuel ratio mixture. In some instances, the non-stoichiometric air/fuel ratio mixture signal is limited to a richer than stoichiometric air/fuel ratio mixture. Upon receiving a signal(s) from the sensors 100, the engine control module 200 can provide an output 300 that optionally energizes a light source. The light source can be located in the line of sight of an operator of the engine, illustratively including in the line of sight of a vehicle driver location within an interior of a motor vehicle. For example, the light source can be located proximate the vehicle speed indicator on an instrument panel.

As shown in FIG. 2, the engine control module 200 can be a microcomputer with a microprocessor for processing, monitoring, analyzing, etc. the sensor inputs 100 in order to determine which actuator outputs should be provided to the engine. In addition, the sensor inputs 100 can be regulated by a voltage regulator 110 and the microcomputer energized by a battery 210.

Figure 3:
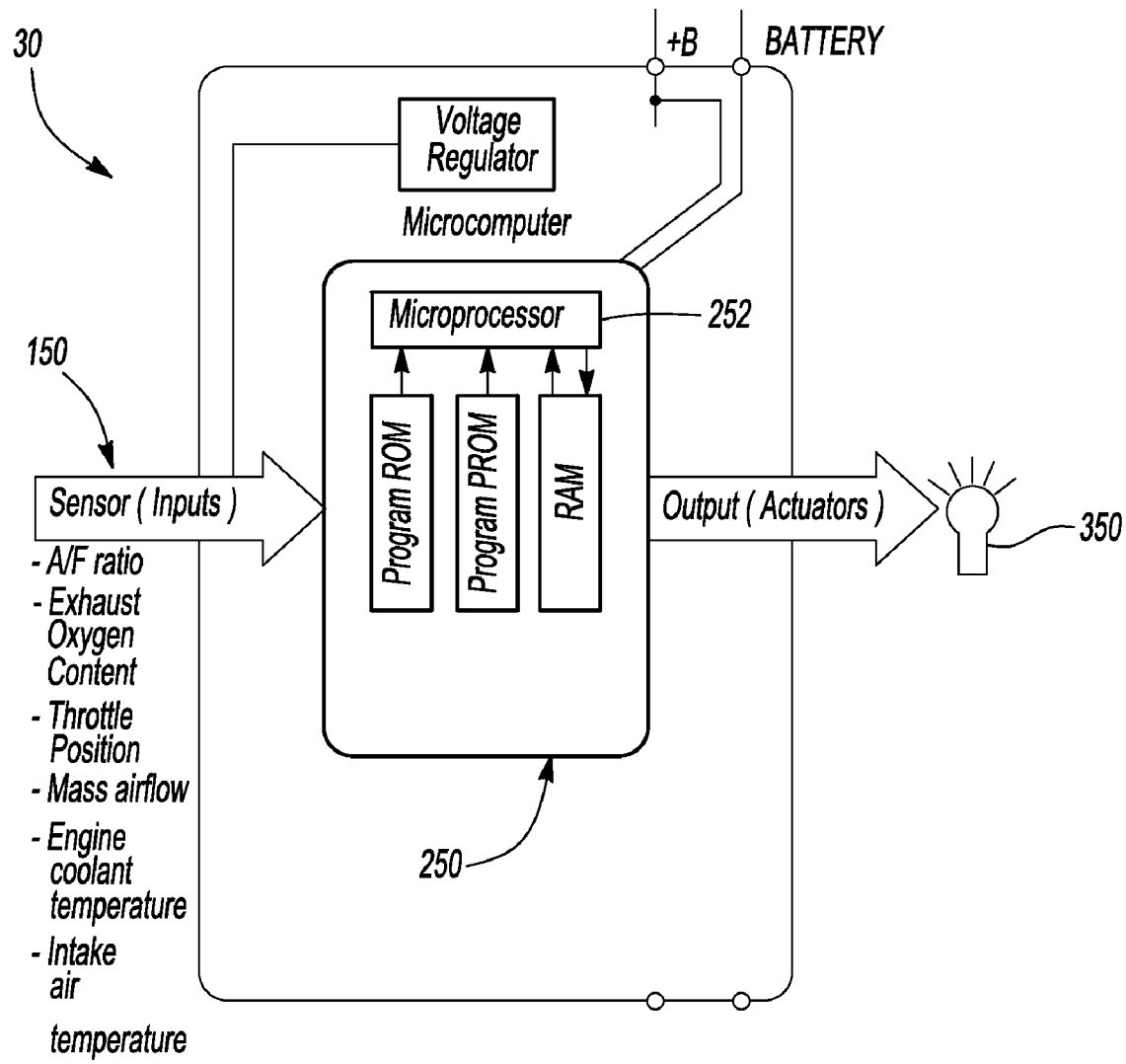
FIG. 3 is a schematic diagram of an embodiment of the present invention.

Turning now to FIG. 3, another embodiment of the method is shown generally at reference numeral 30. The method 30 includes providing one or more sensor inputs 150 to a powertrain control module 250 which can provide an output that affords for the energizing of a light source 350. For example, the powertrain control module 250 can receive a signal from a sensor indicative of an air/fuel ratio, exhaust oxygen content, throttle position, mass airflow, engine coolant temperature, intake air temperature and the like. It is appreciated that other sensors can provide signals to the powertrain control module 250. The powertrain control module 250 can include a microprocessor 252 that can be programmed to process, monitor, analyze, etc., the various sensor inputs received by the powertrain control module 250 and subsequently determine whether or not the light source 350 should be energized.

It is appreciated that by alerting the operator that the engine is not operating in a fuel efficient stoichiometric air/fuel ratio mixture mode, the operator can alter his or her engine operation techniques in order to increase the fuel economy of the engine. For example and for illustrative purposes only, if the driver of a motor vehicle observes a light source indicating that the engine is operating in a richer than stoichiometric air/fuel ratio mixture mode, then the driver can alter the speed of the motor vehicle in order to enhance the engine to operate in a stoichiometric airfuel ratio mixture mode.

It is to be understood that various modifications are readily made to the embodiments of the present invention described herein without departing from the spirit and scope thereof. Accordingly, it is to be understood that the invention is not to be limited by the specific illustrated embodiments, but by the scope of the appended claims.

We claim:

1. A method of signaling an engine operator that an engine is operating in a stoichiometric air/fuel mixture mode or a fuel enriched air/fuel mixture mode, the method comprising:

providing a sensor, the sensor providing a sensor input indicative of a stoichiometric air/fuel ratio mixture or a non-stoichiometric air/fuel ratio mixture is being supplied to the engine;

providing an engine control module operable to receive a sensor input from the sensor and provide an output to a light source when the non-stoichiometric air/fuel mixture is being supplied to the engine; and a light source operable to receive the output from the engine control module and be energized by the output, the light being located in the line of sight of the operator of the engine.

2. The method of claim 1, wherein said non-stoichiometric air/fuel ratio mixture is a richer than stoichiometric air/fuel ratio mixture.

3. The method of claim 1, wherein said engine control module energizes said light source as a function of a plurality of sensor signals.

4. The method of claim 3, wherein said plurality of sensor signals are selected from the group of consisting of air/fuel ratio mixture, exhaust oxygen content, throttle position, mass airflow, engine coolant temperature, intake air temperature, vehicle speed and combinations thereof.

5. The method of claim 1, wherein said signal is from an engine control module inferred air/fuel ratio.

6. The method of claim 1, wherein said signal is from an exhaust detected air/fuel ratio.

7. The method of claim 1, wherein the sensor is an air/fuel sensor.

8. The method of claim 1, wherein the sensor is an exhaust oxygen content sensor.

9. A method of signaling a driver of a motor vehicle that the motor vehicle is operating in a stoichiometric air/fuel mixture mode or a fuel enriched air/fuel mixture mode, the method comprising:

providing an air/fuel sensor, the air/fuel sensor providing a signal representative of a stoichiometric air/fuel ratio mixture being combusted by an engine of the motor vehicle or a non-stoichiometric air/fuel ratio mixture being supplied to the engine of the motor vehicle;

providing a powertrain control module operable to receive the signal from the air/fuel sensor, the powertrain control module operable to energize a light source when the non-stoichiometric air/fuel mixture is being supplied to the engine, the light source located in the line of sight of the driver within an interior of the motor vehicle.

10. The method of claim 9, wherein said non-stoichiometric air/fuel ratio mixture is a richer than stoichiometric air/fuel ratio mixture.

11. The method of claim 9, wherein said powertrain control module energizes said light source as a function of a plurality of sensor signals.

12. The method of claim 11, wherein said plurality of sensor signals are selected from the group of consisting of air/fuel ratio mixture, exhaust oxygen content, throttle position, mass airflow, engine coolant temperature, intake air temperature, vehicle speed and combinations thereof.

13. The method of claim 9, wherein said signal is from a powertrain control module inferred air/fuel ratio.

14. The method of claim 9, wherein said signal is from an exhaust detected air/fuel ratio.

15. A method of signaling a driver of a motor vehicle that the motor vehicle is operating in a stoichiometric air/fuel mixture mode or a richer than stoichiometric air/fuel mixture mode, the method comprising:

providing an air/fuel sensor, the air/fuel sensor providing a signal indicative of a stoichiometric air/fuel ratio mixture or a richer than stoichiometric air/fuel ratio mixture within an engine of the motor vehicle;

providing a powertrain control module operable to receive the signal from the air/fuel sensor, the powertrain control module operable to energize a light source when the richer than stoichiometric air/fuel mixture is being supplied to the engine, the light source located in the line of sight of the driver within an interior of the motor vehicle.

16. The method of claim 15, wherein said powertrain control module energizes said light source as a function of a plurality of sensor signals.

17. The method of claim 16, wherein said plurality of sensor signals are selected from the group of consisting of air/fuel ratio mixture, exhaust oxygen content, throttle position, mass airflow, engine coolant temperature, intake air temperature, vehicle speed and combinations thereof.

18. The method of claim 15, wherein said signal is from a powertrain control module inferred air/fuel ratio.

19. The method of claim 15, wherein said signal is from an exhaust detected air/fuel ratio.

* * * * *